United States Patent [19]

Jaskowiak

[11] Patent Number: 5,308,207
[45] Date of Patent: May 3, 1994

[54] RETAINING RING AND SHAFT FOR SECURING A COMPONENT THEREON

[75] Inventor: Timothy R. Jaskowiak, Lyndonville, N.Y.

[73] Assignee: Xerox Corporation, Stamford, Conn.

[21] Appl. No.: 922,407

[22] Filed: Aug. 24, 1992

[51] Int. Cl.⁵ .................. F16B 21/14; F16B 21/18
[52] U.S. Cl. .................. 411/513; 411/317; 411/353; 411/940; 403/378
[58] Field of Search ............... 411/352, 353, 316, 317, 411/513, 519, 521, 522, 940, 947; 403/378, 379

[56] References Cited

U.S. PATENT DOCUMENTS

| 2,755,698 | 7/1956 | Wurzel . | |
|---|---|---|---|
| 3,726,575 | 4/1973 | Moorman | 308/135 |
| 3,923,408 | 12/1975 | Belsdorf | 403/261 |
| 4,752,178 | 6/1988 | Greenhill | 411/521 |
| 4,818,166 | 4/1989 | Szukay et al. | 411/361 |
| 5,085,548 | 2/1992 | Moyles | 411/522 X |

FOREIGN PATENT DOCUMENTS

| 378746 | 10/1907 | France | 411/513 |
|---|---|---|---|
| 1010993 | 6/1952 | France | 411/513 |
| 25059 | of 1904 | United Kingdom | 411/316 |

Primary Examiner—Neill R. Wilson
Attorney, Agent, or Firm—Denis A. Robitaille

[57] ABSTRACT

An apparatus for mounting and retaining a component on a shaft including a tubular shaft having an aperture extending radially therein, and a retaining ring adapted to fit over the shaft, including a center post wherein the center post is positioned within the aperture on the shaft when the retaining ring is assembled thereon.

4 Claims, 2 Drawing Sheets

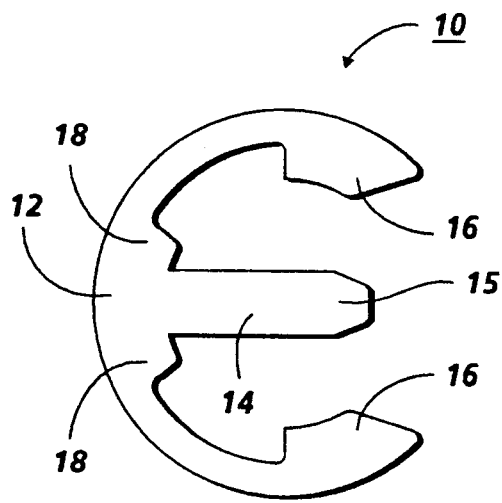
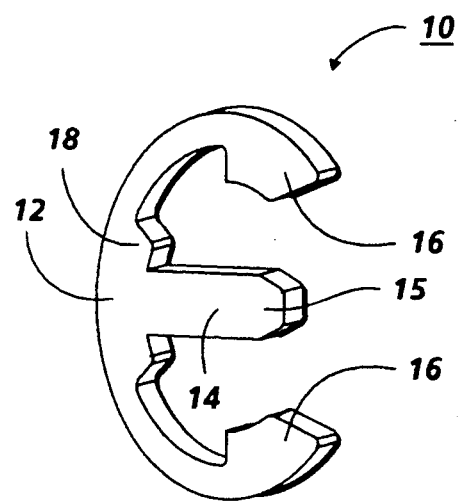
FIG. 1  FIG. 1A
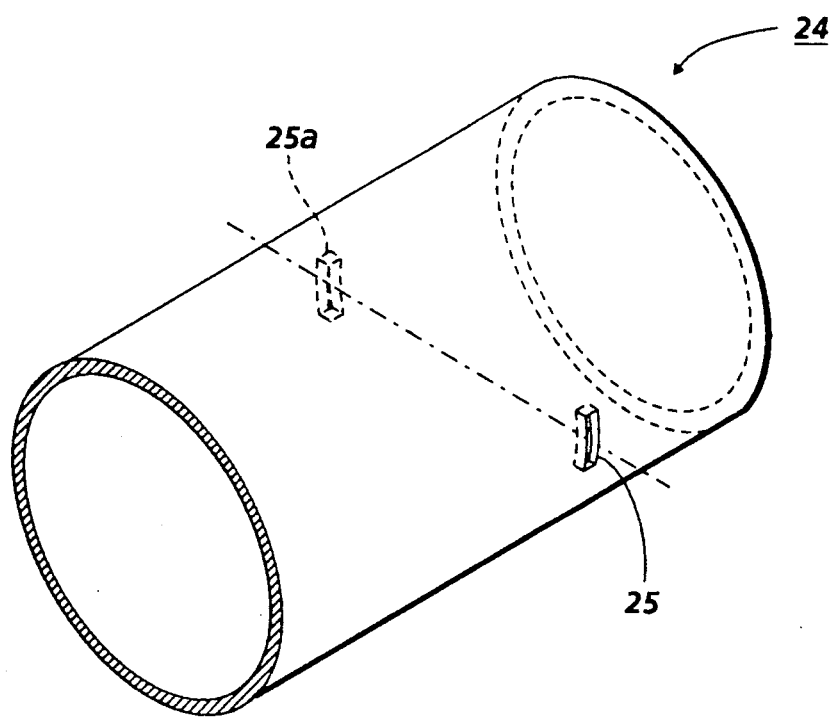
FIG. 2

RETAINING RING AND SHAFT FOR SECURING A COMPONENT THEREON

This invention relates generally to mechanical fasteners and, more particularly, to a combination shaft and retaining ring for securing components on a shaft and for locating the shaft relative to a subassembly into which the shaft is installed.

Many applications exist for mounting a component along the outer diameter of a shaft. Typically, a circular retaining ring is mounted within a groove or channel machined about the circumference of a shaft. Positioning a retaining ring within a groove preferably exerts a uniform pressure on the shaft, around the entire circumference of the shaft, to prevent any radial misalignment of a component mounted thereon.

This objective is most commonly accomplished by providing the shaft with at least one circumferential groove for receiving a circular retaining ring, wherein the retaining ring of known construction is inserted into the groove. A portion of the retaining ring projects beyond the outer diameter of the shaft for abutment with the component mounted thereon to prevent the component from moving relative to the shaft or for preventing the shaft from moving relative to a subassembly into which the shaft may be installed. Using this approach, a groove must be machined onto the shaft to a very close tolerance so that there will be minimum play between the ring and the shaft once the retaining ring is put in place within the groove on the shaft.

Such ring/groove combinations for preventing relative movement between a shaft and a component or subassembly have distinct disadvantages. First and foremost, this method requires that an annular groove be formed along the circumference of the shaft. Furthermore, the channel or groove on the shaft often requires a particular configuration, as for example a beveled groove, so as to provide proper positioning for the retaining ring against the component when mounted on the shaft. This technique has further disadvantages in that grooves cannot be applied in a space that is structurally restricted. Furthermore, special tools may be required to release the retaining ring from the groove. Moreover, modern day applications often use hollow tubular shafts or tubular shafts filled with plastic which offer certain cost advantages; such tubular shafts cannot be machined with grooves or channels for receiving the retaining rings without affecting the structural integrity of the shaft.

Various approaches have been contemplated and devised for addressing the issue of mounting and retaining a component on a shaft and the problems associated therewith. The following disclosures may be relevant to various aspects of the present invention:
U.S. Pat. No. 2,755,698
Patentee: Wurzel
Issued: Jul. 24, 1956
U.S. Pat. No. 3,726,575
Patentee: Moorman
Issued: Apr. 10, 1973
U.S. Pat. No. 3,923,408
Patentee: Belsdorf
Issued: Dec. 2, 1975
U.S. Pat. No. 4,752,178
Patentee: Greenhill
Issued: Jun. 21, 1988
U.S. Pat. No. 4,818,166
Patentee: Szukay et al.
Issued: Apr. 4, 1989

The relevant portions of the foregoing disclosures may be briefly summarized as follows:

U.S. Pat. No. 2,755,698 discloses a retaining ring having engaging projections adapted to be seated in a groove provided in a shaft for forming an artificial shoulder on the shaft to prevent axial displacement of a machine part mounted thereon.

U.S. Pat. No. 3,726,575 describes an apparatus for controlling shaft end-play including a bearing mounted within a housing and a shaft rotatably supported by the bearing, wherein an end portion of the shaft extends beyond the bearing within the housing. A circumferential groove in the shaft end portion receives radially inwardly extending teeth of a flat washer secured to the housing and the washer is retained adjacent the outer periphery of the shaft by means of a spring ring engaging the housing. Shaft end-play is limited in the axial direction by engagement of the circumferential groove with the inwardly extending teeth of the secured washer.

U.S. Pat. No. 3,923,408 discloses a mechanism for fastening a ring on a shaft so as to secure it against a changing axial load by providing a closed locking ring on the shaft which is permanently deformed so as to rest in an annular groove in the shaft. One face of the locking ring bears against the component being secured while the other face of the ring Is mechanically biased against the wall of the groove.

U.S. Pat. No. 4,752,178 describes a circular waved retaining ring including a series of waives equidistantly spaced about the ring. The ring fits in a groove formed either on a shaft or in a cylinder bore wherein the width of the groove is slightly greater than the distance between successive wave crests and troughs on the waved retaining ring. The retaining ring assembly axially secures a work element to a shaft and maintains the work element in a preselected position on the shaft by exerting uniform pressure on the work element.

U.S. Pat. No. 4,818,166 describes an attachment for axially securing a component on a surface of a shaft by forming an annular groove adjacent the component and inserting a closed retaining ring within the annular groove. The retaining ring is pressed into the annular groove and plastically deformed by a tool that contacts the ring at angularly spaced portions of the retaining ring surface until the ring fills the groove without axial clearance or play.

In accordance with the present invention, there is provided a retaining apparatus for axially securing a component onto a shaft, including a shaft having an outer periphery adapted to receive a component for mounting thereon wherein the shaft includes an aperture extending radially inward, and a retaining ring having an inner periphery adapted to be assembled on the shaft, wherein the retaining ring includes a center post extending radially outward from the inner periphery for insertion within the aperture on the shaft.

In accordance with another aspect of the present invention, a retaining ring is provided for axially mounting onto a shaft adapted to receive a component for mounting thereon, wherein the shaft includes an aperture extending radially inwardly therefrom the retaining ring including a semicircular profile having an inner periphery adapted to be assembled onto the shaft, and a center post extending radially inwardly from the inner periphery for insertion within the aperture of the shaft.

For a better understanding of the invention, as well as other objects and further features thereof, reference is made to the following drawings and description. Other aspects and features of the present invention will become apparent as the following description proceeds and upon reference to the drawings, in which:

FIG. 1 is a plan view of the retaining ring of the present invention used for fastening a component on the outer surface of a shaft;

FIG. 1A is a perspective view of the retaining ring of FIG. 1;

FIG. 2 is a perspective view of the shaft used in conjunction with the retaining ring of the present invention;

Figure 3:
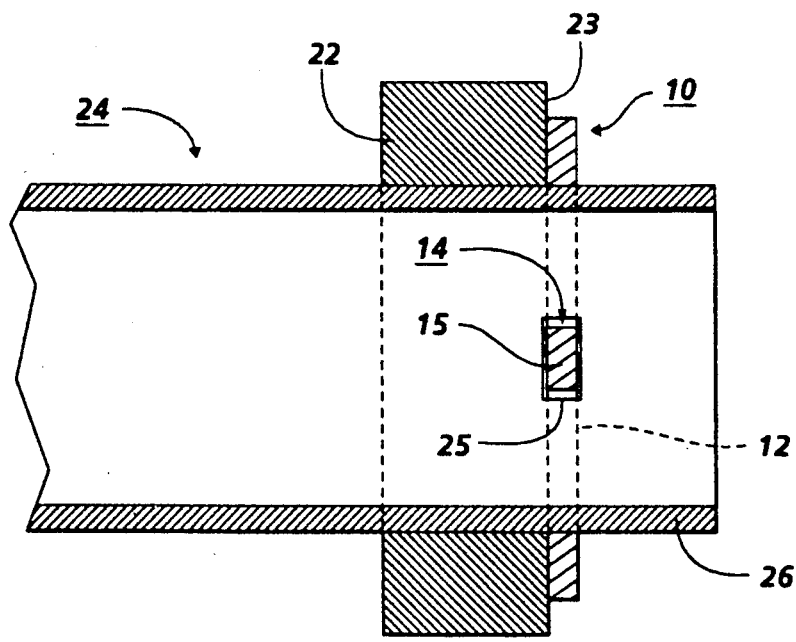
FIG. 3 is a sectional, elevational view illustrating the retaining ring of the present invent(on mounted on a shaft and cooperating with a component mounted thereon.

Referring initially to FIG. 3, before describing the specific features of the shaft and the retaining ring constructed in accordance with the principles of the present invention, a system employed to prevent substantial lateral movement of a component 22 axially mounted on a longitudinal shaft 24 is shown. The component 22 has a bearing surface 23, generally perpendicular to the longitudinal axis of the shaft 24, which abuts a retaining ring 10 mounted on the shaft 24.

Moving now to FIG. 1, the retaining ring 10 of the present invention is shown, including a substantially flat semicircular annular body 12 having a radial center post 14 extending inwardly from the body 12. The center post 14 terminates in a tapered or arcuate segment 15 defining a leading edge of the center post 14. The retaining ring 10 may also include a plurality of teeth or shoulder segments 16, 18 extending radially inward along the interior surface of the ring body 12 to define stabilizing points against which the ring will rest when positioned on the shaft 24. While the ring 10 is shown to include two shoulder segments 16 located adjacent the ends of the ring body 12 and two central shoulder segments 18 adjacent the center post 14, it will be understood that any number of such shoulder segments could be provided at any location along the inner periphery of the retaining ring body 12.

With reference to FIG. 2, a shaft 24 is illustrated, wherein the shaft 24 includes an aperture 25 defining a through hole for receiving the center post 14 of retaining ring 10. The aperture 25 has a generally rectangular shape extending radially inward from the outside wall of shaft 24. As discussed, the retaining ring 10 of the present invention is advantageously used in combination with a shaft of a hollow tubular nature. In this case, the aperture 25 must extend through only one segment of the tubular wall of the shaft. Alternatively, a second aperture 25a may also be provided through a second segment of the shaft wall opposite aperture 25 for receiving the center post 14 of retaining ring 10, assuming the center post 14 has a length at least equal to or greater than the diameter of the shaft 24.

Figure 2A:
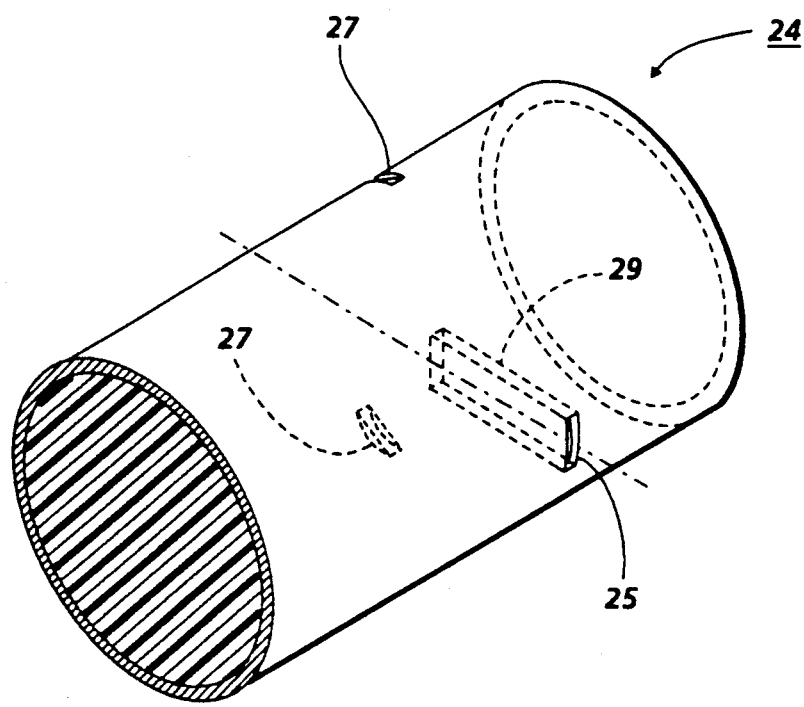
FIG. 2A is a perspective view of an alternative embodiment of the shaft used in conjunction with the retaining ring of the present invention.

In another alternative embodiment, as shown in FIG. 2A the hollow shaft may be provided with a core material of plastic or some other substance different from the material of the metal shaft. In this embodiment, the core material is provided with a pocket 29 or a passageway for receiving the center post 14 of the retaining ring 10. It it also feasible to provide several notches 27 along a common plane even with the aperture 25, as shown in FIG. 2A, each notch 27 being positioned for receiving a corresponding shoulder 16 on retaining ring 10 for selectively securing the retaining ring 10 in a fixed axial position on the shaft 24. These notches 27 may pass through the tubular wall 26 of the shaft 24 or may merely comprise a slot forming an indentation in the surface of the tubular wall 26. Accordingly, the retaining ring 10 can be fixed in an axial direction with respect to the shaft 24, suitable for absorbing the axial forces which occur in changing directions. The apertures 25, 25a, notches 27, and/or pocket 29 may be provided by laser cutting, cold chiseling, drilling or by any other known technology.

In operation, the retaining ring 10 is assembled upon the shaft 24, as shown in FIG. 3, such that the center post 14 extends within aperture 25 to assure engagement of the retaining ring 10 with the shaft 24. The retaining ring 10 prevents axial movement of the component 22 mounted on the shaft 24 or provides for locating the shaft relative to a subassembly onto which the shaft is installed by providing a secure structure for producing resistive force between the peripheral portions of the retaining ring and the radially extending surface of the component 24 to be secured or the subassembly into which it is installed. This resistive force can be varied to allow for selective axial movement of the component 22 on the shaft 24 by varying such factors as the thickness of the retaining ring, the curvature of the annular body, the type of material utilized in fabricating the retaining ring, heat treatment of the ring, as well as other factors. Additionally, the dimensions of the aperture 25 or the dimensions of notches 27, if provided, may be varied relative to the dimensions of the center post 14 or shoulder segments 16, 18 to allow some axial movement of the ring with respect to the shaft 24.

In recapitulation, it is clear that the apparatus of the present invention provides a retaining ring for maintaining a component in a fixed position on a shaft. The retaining ring includes a center post for inserting within an aperture provided on the shaft to mount the retaining ring on the shaft. The retaining ring of the present invention is advantageously utilized in combination with a tubular shaft having a hollow or filled interior region wherein the retaining ring can be mounted on the shaft without the need for a groove or channel on the shaft. The retaining ring/shaft combination of the present invention provides a means for assuring that the structural integrity of a hollow shaft is not compromised.

It is, therefore, apparent that there has been provided, in accordance with the present invention, a retaining apparatus including a retaining ring and shaft for securing a component thereon or for locating the shaft relative to a subassembly into which the shaft is installed which fully satisfies the aspects and advantages hereinbefore set forth. While the invention has been described in conjunction with a specific embodiment thereof, it will be evident that many alternatives, modifications, and variations are possible to achieve the desired results. Accordingly, the present invention is intended to embrace all such alternatives, modifications, and variations which may fall within the spirit and scope of the following claims:

I claim:

1. A retaining apparatus for axially securing a component having a bearing surface onto a shaft, comprising:
   a shaft having an unthreaded portion and an outer periphery adapted to receive the component for mounting thereon, said shaft defining a first aperture extending radially inwardly from said outer periphery along the unthreaded portion; and a retaining ring including an inner periphery adapted to be assembled on the unthreaded portion of said shaft and a ring body for applying a retaining force against the bearing surface of the component mounted thereon, said retaining ring including a center post extending radially inwardly from said inner periphery for insertion within the aperture of said shaft, wherein said retaining ring further includes a plurality of shoulder segments extending radially inwardly from said inner periphery for defining stabilizing points against which said retaining ring will rest when assembled on said shaft.

2. The retaining apparatus of claim 2, wherein said shaft defines a plurality of notches formed along said shaft outer periphery on a common plane with said aperture for receiving said shoulder segments.

3. A retaining apparatus for axially securing a component onto a shaft, comprising:

a shaft including a hollow tubular structure having an outer periphery adapted to receive the component for mounting thereon, said shaft defining an aperture extending radially inwardly from said outer periphery and a plurality of notches formed along said shaft outer periphery on a common plane with said aperture; and a retaining ring including an inner periphery adapted to be assembled on said shaft for applying a retaining force against the component mounted thereon, said retaining ring including a center post extending radially inwardly from said inner periphery for insertion within the aperture of said shaft, and further including a plurality of shoulder segments extending radially inwardly from said inner periphery for cooperating with said plurality of notches formed along said shaft outer periphery to define stabilizing points against which said retaining ring will rest when assembled on said shaft;

wherein said shaft further includes a core material located within said hollow tubular structure and said core material includes a pocket adapted for receiving therein the center post of said retaining ring.

4. A retaining ring for axially securing a component having a bearing surface onto an unthreaded portion of a shaft adapted to receive the component for mounting thereon, wherein the shaft defines an aperture extending radially inwardly thereon, said retaining ring comprising:

a semi-circular profile having an inner periphery adapted to be assembled onto the unthreaded portion of said shaft and a ring body for applying a retaining force against the bearing surface of the component mounted thereon; and a center post extending radially inwardly form the inner periphery of said retaining ring for insertion within the aperture of the shaft with said retaining ring assembled thereon; and further including a plurality of shoulder segments extending radially inwardly from the inner periphery for defining stabilizing points against which said retaining ring will rest when assembled on the shaft.

* * * * *